April 15, 1952     G. P. JACKSON     2,592,701
BURNING AND DISPOSAL OF FURNACE FLY ASH
Filed July 13, 1946
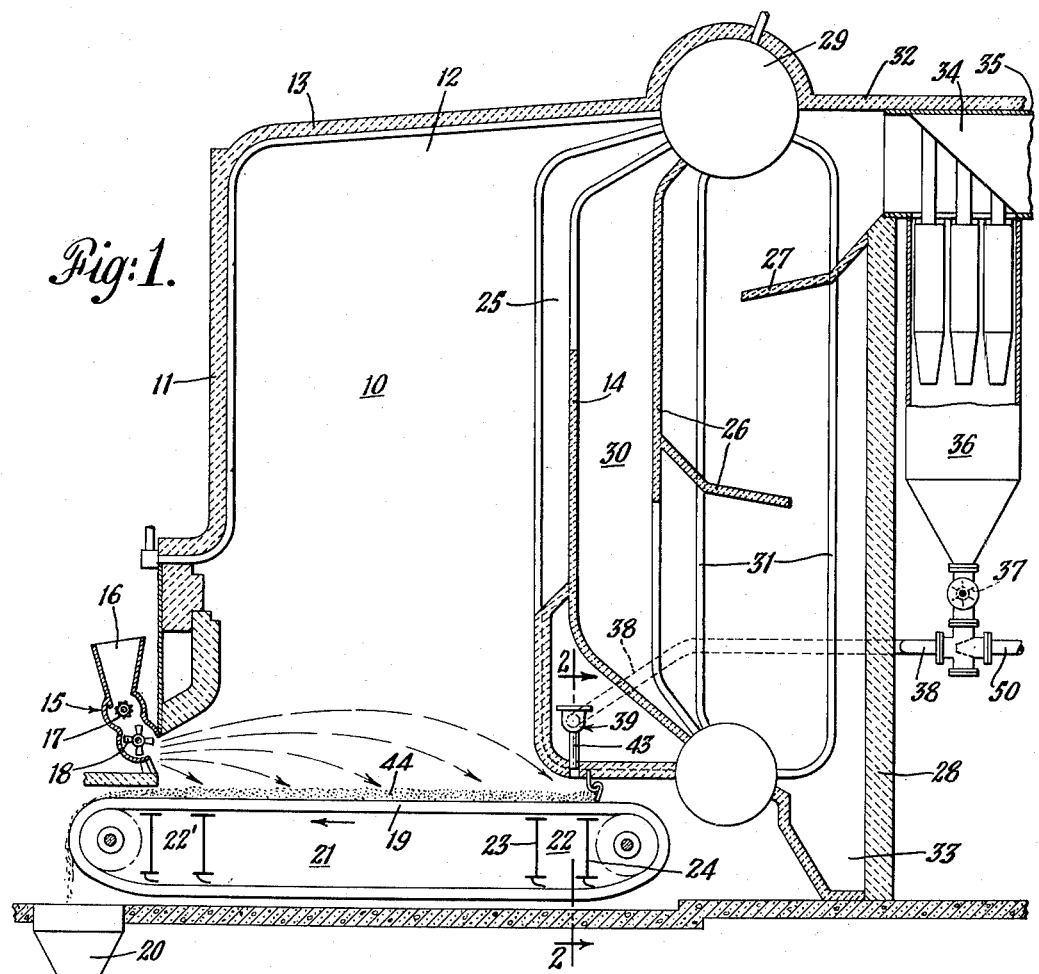
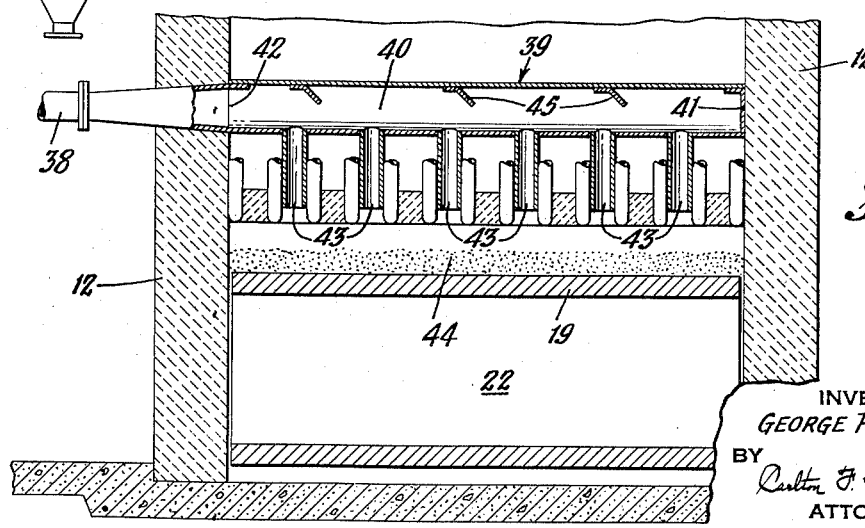
INVENTOR
GEORGE P. JACKSON
BY
Carlton F. Bryant
ATTORNEY Patented Apr. 15, 1952

2,592,701

UNITED STATES PATENT OFFICE 2,592,701

BURNING AND DISPOSAL OF FURNACE FLY ASH

George P. Jackson, Flushing, N. Y., assignor to Combustion Engineering-Superheater, Inc., a corporation of Delaware Application July 13, 1946, Serial No. 683,328

3 Claims. (Cl. 110—165)

This invention relates to the operation of furnaces that have traveling grates upon which fuel is supplied for burning in a moving bed, and it has special reference to usefully burning the combustible matter in the fly ash from such furnaces and to satisfactorily disposing of the non-burnable residue from such fly ash.

The improvements hereof are especially useful with, though not restricted to, traveling-grate furnaces which employ spreader stoker firing. In one well known form of such firing the fuel flows from a hopper through a feeder to a coal distributor or spreader located directly below the feeder, the spreader comprising an assembly of rotating impellers which project the fuel into the furnace. The impellers are shaped to distribute the fuel substantially uniformly over a grate at the bottom of the furnace where it burns. During flight of the fuel from the spreader through the furnace, a portion of the finer sized fuel is carried in suspension by the products of combustion rising from the grate up through and out of the furnace and is partly burned therein.

If a boiler is associated with the furnace a portion of this finer partly burned fuel, or so-called "fly ash," will separate out and settle at the bottom of the boiler passes and a remaining portion will be carried out through the boiler and may be separated out of the flue gas and collected as by means of cyclone separators. The fly ash may contain about 30 or 40% combustible matter so that it is desirable to reintroduce it into the furnace to burn out the combustible matter and reclaim the heat therefrom.

Heretofore this fly ash has been returned to the furnace through jets which delivered it a substantial distance above the grate into the main portion of the products of combustion flowing upwardly through the furnace. It was found that although the combustible matter in the fly ash so delivered was further consumed in the furnace, it was again carried back into the boiler with the products of combustion and thereby increased the loading of fly ash in the products passing through the boiler. Furthermore the thus increased loading of fly ash in the flue gases has been found to impair the value as a nuisance eliminator of a separator located in the breeching of the boiler, it tending to raise the quantity of fly ash which escapes from the separator into the atmosphere where it constitutes an objectionable nuisance. Heretofore, moreover, when a traveling grate was used in association with the above mentioned means of introducing fly ash into the furnace, the grate served only as the usual means of supporting the fuel bed and for continuously discharging the ash, and it did not directly contribute to the disposal of the fly-ash residue.

Broadly stated, the object of this invention is to provide novel means for re-introducing fly ash into a furnace that has a traveling grate upon which fuel is supplied for burning in a moving bed.

A more specific object is to effect the fly-ash re-introduction in a unique way which permits the fly-ash combustible matter to be usefully burned while assuring that the non-burnable fly-ash residue will satisfactorily be carried out of the combustion chamber by the furnace's traveling grate.

Additional objects and advantages of the invention will appear from the following description of a preferred embodiment thereof when considered in conjunction with the accompanying drawings wherein:

Figure 1 is a vertical section through a furnace and boiler showing one form of the invention applied thereto; and Figure 2 is a vertical section on line 2—2 of Figure 1 through one form of means for returning the fly ash into the fuel bed.

In Figure 1 a furnace chamber 10 is defined by a front wall 11, side walls 12, roof 13 and a rear wall 14 which forms part of the baffling of a steam generator. A spreader 15 located in the front wall 11 has a fuel hopper 16 supplying fuel to a feeder 17 which in turn delivers it at a controlled rate to impeller blades 18 that project the fuel into the furnace on to a grate 19. The fuel is distributed substantially uniformly over the area of the grate exposed to the furnace.

The spreader 15 here shown is of the general type disclosed in the United States Patent to W. C. Stripe No. 2,337,945, issued December 28, 1943. Obviously, jets of fluid may be used instead of impellers 18 to project the fuel into the furnace. The illustrated grate 19 is of the usual traveling type and moves beneath the furnace either from front to rear or from rear to front. As shown, the grate of Figure 1 travels from rear to front and discharges ash at the front end into a hopper 20.

Air for combustion of the fuel is delivered into the space 21 between the top and bottom run of the traveling grate and flows upwardly through the grate and fuel bed thereon. The space 21 may be divided into compartments, such as compartment 22, by partitions 23 and 24 in the usual manner. The products of combustion from the fuel rise vertically through the furnace to the offtake 25 over the top of rear furnace wall 14.

Baffles 26 and 27 cooperate with the rear wall 28 of the boiler 29 to cause the hot gases from the furnace offtake 25 to flow downwardly through pass 30 thence transversely across the bottom of a bank of boiler tubes 31 and upwardly back and forth across said boiler tubes to the boiler breeching 32. In passing across the bottom of the bank of boiler tubes 31 the gases reverse from a downward flow to an upward flow during which reversal a portion of the coarser fly ash separates out and collects in the bottom of pit 33.

A fly-ash separator 34, typified by a multiplicity of cyclone elements connected in parallel for gas flow therethrough, is located at the rear of the boiler setting and connected to the breeching 32. After passing through the separator 34 the gases leave separator outlet 35. The separated dust is collected in a hopper 36 and is thence fed through a rotating valve 37 into a conduit 38.

The conduit 38 is provided with a fluid nozzle 50 through which a fluid is blown into the conduit 38 which conveys the fly ash to a distributing means 39. As here shown, distributing means 39 comprises a tube 40 (see Figure 2) having a closed end 41 and an open end 42 for receiving the fly ash from the conduit 38. In the case of an exceptionally wide stoker it may be desirable to feed the fly ash into both ends of tube 40.

Connected to the bottom of tube 40 are a multiplicity of pipes 43 extending transversely of the furnace and substantially equally spaced. These pipes 43 extend downwardly and terminate closely adjacent the fuel bed 44 on the traveling grate 19. In the installation shown, the pipes 43 are located at the end of the grate remote from the spreader 15. Were, however, the grate 19 to travel from front to rear (instead of from rear to front as illustrated) the ash distributing pipes 43 would be located at the furnace front.

The fly ash which settles in the pit 33 of the boiler setting, being generally of a coarser grade than that collected in the fly ash separator 34, may be removed from pit 33 and injected into the furnace either at a point above the trajectory of the spreader-projected fuel in the usual manner or (not here shown) upon the rear edge of the fuel bed through conduit 38 and tube 40 in accordance with this invention.

In the operation of the spreader stoker the fuel from hopper 16 is delivered by feeder 17 to impellers 18 and is projected by these into the furnace in substantial uniform distribution over the entire area of grate 19 exposed to the furnace. The top of the grate 19 may be moved in directions either toward or from the furnace front at a relatively slow velocity. Due to the slow velocity a bed of ash is maintained between the burning bed of fuel and the grate surface.

It is characteristic of a spreader that the impeller 18 thereof will project the coarser fuel to the end of the grate farthest from the spreader and the finer fuel to the end nearest the spreader. Because of this distribution of the fuel, I prefer to move the top of the grate 19 in a direction toward the spreader and to introduce the fly ash through pipes 43 into that portion of the fuel bed farthest from the spreader. The open ends of pipes 43 are preferably spaced closely adjacent the fuel bed 44. The fly ash is thereby dropped into and commingled with the coarser fuel which is being continuously delivered by the spreader onto the farthest end of the grate.

As the fly ash continuously feeds into the fuel and is continuously carried away therewith across the furnace, it is simultaneously being continuously covered by additional fuel delivered from the spreader. The fly ash thus enveloped by the fuel is retained by it while the combustible matter of the fly ash is burned. The remaining ash together with the ash from the fuel is carried to the end of the grate under the spreader 15 where it is discharged into ash hopper 20.

The fly ash is preferably introduced into the fuel bed with least disturbance substantially uniformly across the width of the grate and at a minimum velocity. If a current of air or gas is used to convey the fly ash to the tube 40, this air will escape through the pipes 43 through which the fly ash falls to the fuel bed. Preferably there should be only an exceedingly small air velocity through pipes 43; a velocity of about two feet per second may be permissible. The air compartment 22 is provided to controllably reduce the relative air flow up through the fuel bed at the location where the fly ash is being introduced so as to minimize any tendency to blow the fly ash up into the furnace.

Should the top of the grate 19 be moved in a direction away from the spreader, the fly ash will be introduced at the end of the grate beneath the spreader by means similar to those used at the remote end described above. An air compartment 22′ may then be placed beneath the end of the grate beneath the spreader and the ash hopper will then be placed under the farthest end of the grate.

Obviously the fly ash may be conveyed to the furnace, from the hopper or hoppers into which it has fallen after separation, by other means than an air current, such as through the medium of the well-known screw conveyors.

When air or gas is used as a conveyor for delivering the fly ash to tube 40 the velocity within the tube is preferably kept low, the maximum permissible longitudinal velocity may be about five to six feet per second. Should the distribution of fly ash within tube 40 to pipes 43 be uneven, deflecting means such as plates 45 (see Figure 2) may be installed to effect a more uniform distribution.

While the preferred embodiment of my invention has been shown and described, it will be understood that minor changes in construction, combination and arrangement of parts may be made without departing from the spirit and scope of the invention as claimed.

What I claim is:

1. In the operation of a furnace having a traveling grate upon which fuel is projected from one end of the combustion chamber for burning on a bed which is moved by said grate toward that chamber end, the method of disposing of the furnace fly ash from said burning fuel which comprises collecting said fly ash from the fuel combustion gases, introducing said collected fly ash into the upper portion of said burning fuel bed outside of the main burning area from which said combustion gases rapidly rise and near the end of said traveling grate that is remote from the fuel-projection end of said combustion chamber but at a location where fuel is deposited upon the grate surface, advancing said thus-introduced fly ash across the furnace toward the traveling grate's opposite or fuel-projection end along with the grate-carried bed of burning fuel and fuel ash while continuously projecting new fuel thereupon thereby covering said fly ash and thereby usefully burning the combustible portions of said fly ash while that ash thus travels across the furnace in said bed, and discharging from the furnace at the traveling grate's said opposite end the unburnable fly ash along with the main ash from the burned fuel.

2. In the operation of a furnace having a traveling grate upon which fuel is projected by a spreader stoker for burning in a fuel bed upon the grate, the method of disposing of furnace fly ash which comprises introducing said fly ash into the upper portion of said burning fuel bed substantially uniformly thereacross near the end of said traveling grate that enters the furnace combustion chamber but at a location where fuel is deposited upon the grate surface, advancing said thus-introduced fly ash across the furnace toward the traveling grate's opposite or chamber-leaving end along with the grate-carried bed of burning fuel and fuel ash while continuously adding new fuel from said stoker substantially uniformly on to the entire area of the bed thereby covering said fly ash and thereby usefully burning the combustible portions of said fly ash while in direct contact with the burning fuel in said bed, and discharging from the furnace at the traveling grate's said chamber-leaving end the unburnable fly ash residue along with the main ash from the burned fuel.

3. In the operation of a furnace having a traveling grate upon which fuel is projected by a spreader stoker for burning in a bed which is moved toward the stoker by said grate, the method of disposing of furnace fly ash which comprises introducing said fly ash into the upper portion of said burning fuel bed outside of the main burning area from which fuel combustion gases rapidly rise and near the end of said traveling grate that is remote from the point of stoker fuel projection into the furnace but at a location where fuel is deposited upon the grate surface, advancing said thus-introduced fly ash across the furnace toward the traveling grate's opposite or stoker end along with the grate-carried bed of burning fuel and fuel ash while continuously projecting new fuel thereupon from said stoker thereby covering said fly ash and thereby usefully burning the combustible portions of said fly ash while that ash thus moves across the furnace in said bed, and discharging from the furnace at the traveling grate's said stoker end the unburable fly ash residue along with the main ash from the burned fuel.

GEORGE P. JACKSON.

REFERENCES CITED

The following references are of record in the file of this patent:

UNITED STATES PATENTS

| Number | Name | Date |
| --- | --- | --- |
| 510,552 | Richards | Dec. 12, 1893 |
| 510,572 | Coxe | Dec. 12, 1893 |
| 939,444 | Ridgeway | Nov. 9, 1909 |
| 1,362,026 | Maskrey | Dec. 14, 1920 |
| 1,898,479 | Coghlan et al. | Feb. 21, 1933 |
| 1,943,949 | Coghlan et al. | Jan. 16, 1934 |
| 2,029,285 | Bennett | Feb. 4, 1936 |
| 2,110,452 | Moyer | Mar. 8, 1938 |
| 2,386,336 | Mosshart | Oct. 9, 1945 |
| 2,493,960 | Gladden | Jan. 10, 1950 |

FOREIGN PATENTS

| Number | Country | Date |
| --- | --- | --- |
| 118,979 | Great Britain | Sept. 19, 1918 |
| 127,062 | Australia | Feb. 25, 1932 |